May 22, 1956  W. M. THOMPSON ET AL  2,746,662
AUTOMATIC CARTON-CASE LOADING MACHINE
Filed Oct. 27, 1951  8 Sheets-Sheet 1

*INVENTOR.*
WALLACE M. THOMPSON
ALBERT G. SWINT JR
ALVIN T. ROBERTS JR
BY
ATTORNEY

May 22, 1956  W. M. THOMPSON ET AL  2,746,662
AUTOMATIC CARTON-CASE LOADING MACHINE
Filed Oct. 27, 1951  8 Sheets-Sheet 2

*INVENTOR.*
WALLACE M. THOMPSON
ALBERT G. SWINT JR.
ALVIN T. ROBERTS JR
BY
ATTORNEY

May 22, 1956
W. M. THOMPSON ET AL
2,746,662
AUTOMATIC CARTON-CASE LOADING MACHINE
Filed Oct. 27, 1951
8 Sheets-Sheet 3
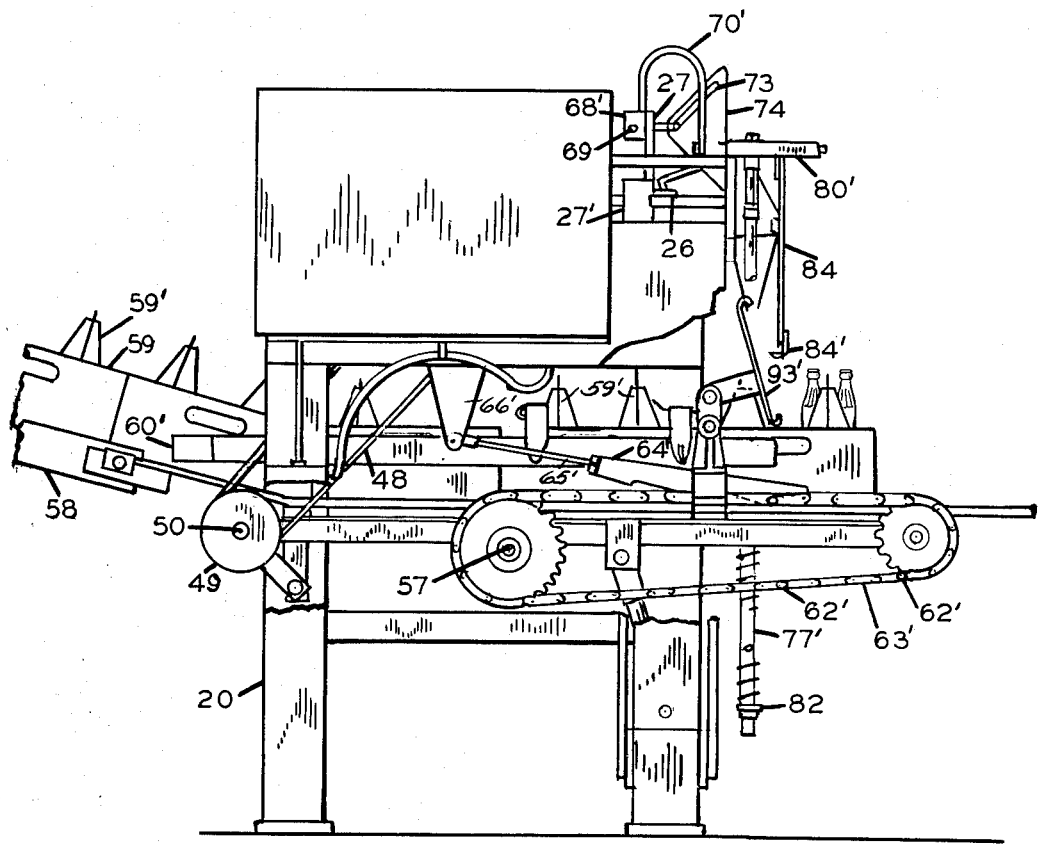
FIG 4
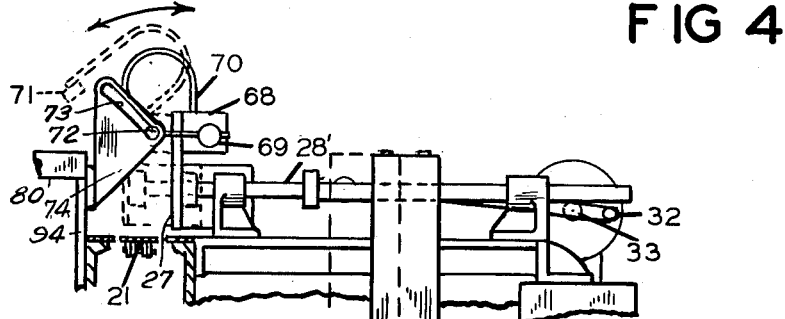
FIG 7
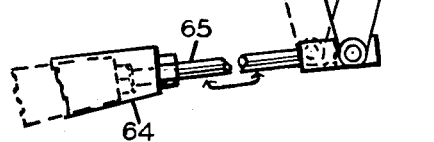
INVENTOR.
WALLACE M. THOMPSON
ALBERT G. SWINT JR
ALVIN T. ROBERTS JR
BY
ATTORNEY

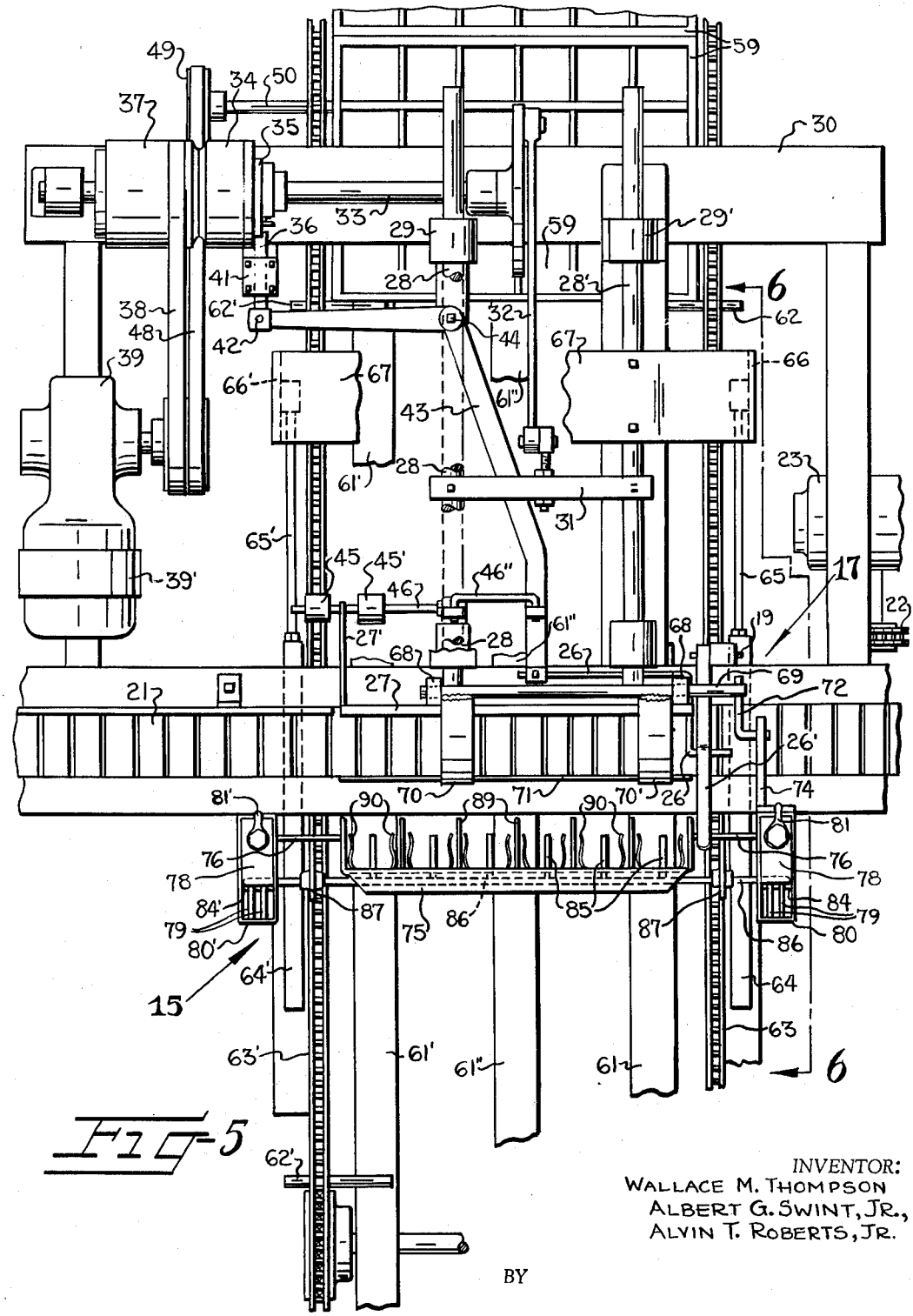

May 22, 1956  W. M. THOMPSON ET AL  2,746,662
AUTOMATIC CARTON-CASE LOADING MACHINE
Filed Oct. 27, 1951  8 Sheets-Sheet 5
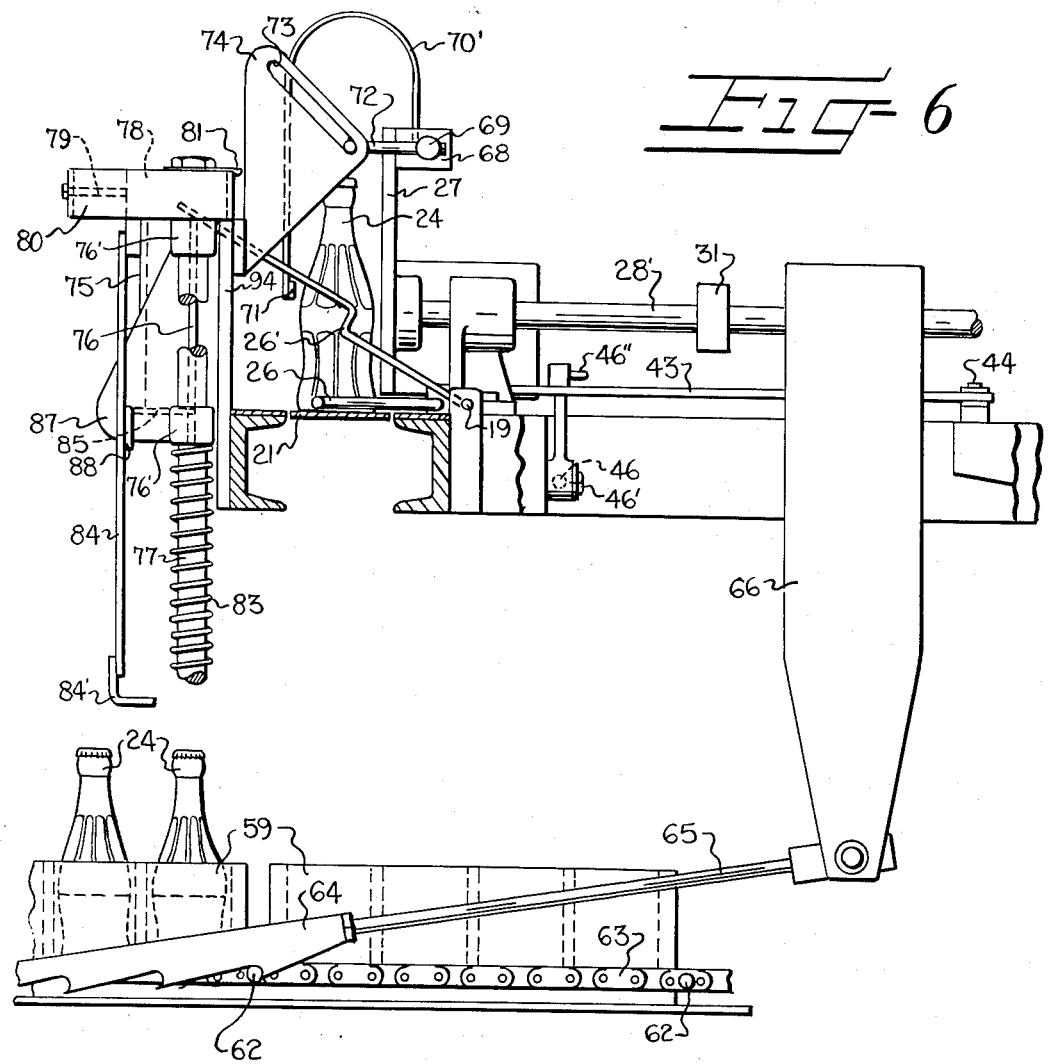
WALLACE M. THOMPSON,
ALBERT G. SWINT, JR.,
ALVIN T. ROBERTS, JR.
INVENTOR
BY
ATTORNEY May 22, 1956  W. M. THOMPSON ET AL  2,746,662
AUTOMATIC CARTON-CASE LOADING MACHINE
Filed Oct. 27, 1951  8 Sheets-Sheet 6
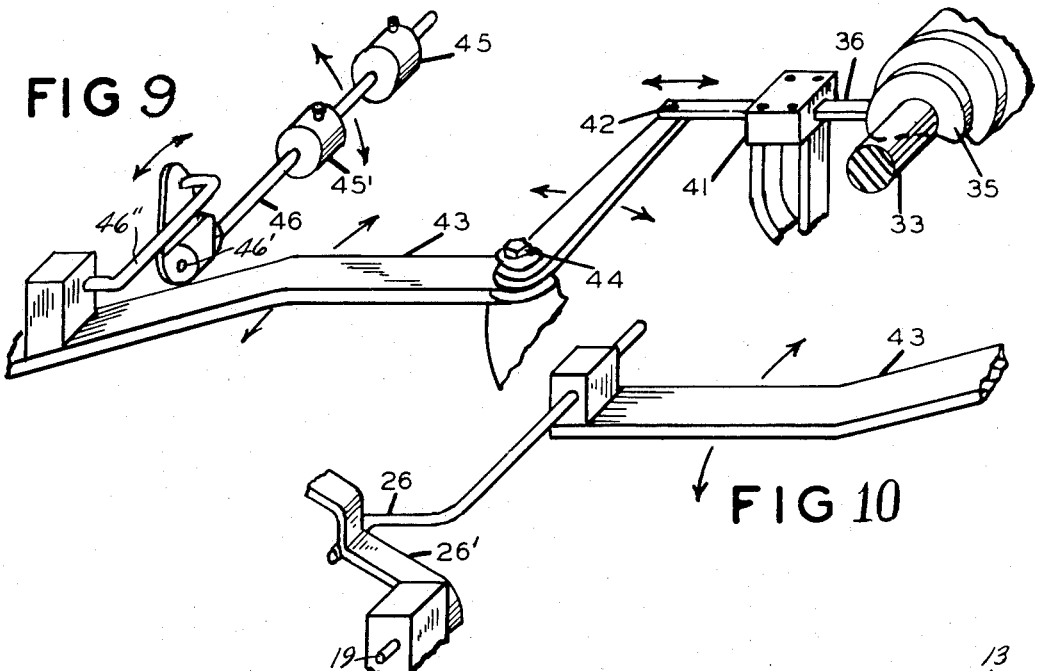
FIG 9
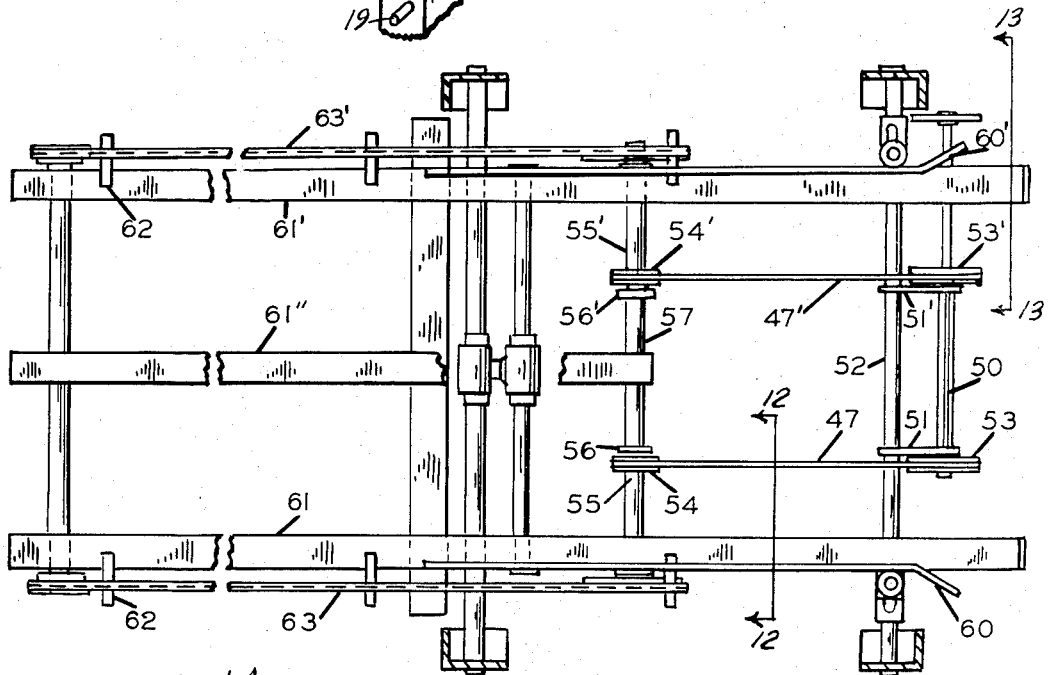
FIG 10
FIG 11
INVENTOR.
WALLACE M. THOMPSON
ALBERT G. SWINT JR
ALVIN T. ROBERTS JR
BY
ATTORNEY May 22, 1956     W. M. THOMPSON ET AL     2,746,662
AUTOMATIC CARTON-CASE LOADING MACHINE
Filed Oct. 27, 1951                                                8 Sheets-Sheet 7
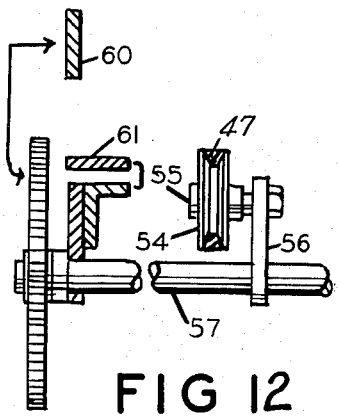
FIG 12
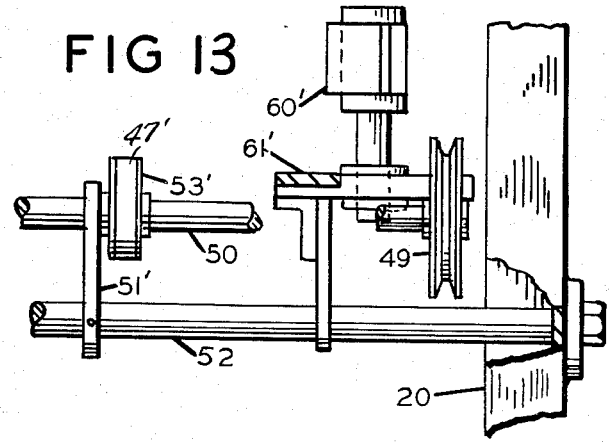
FIG 13
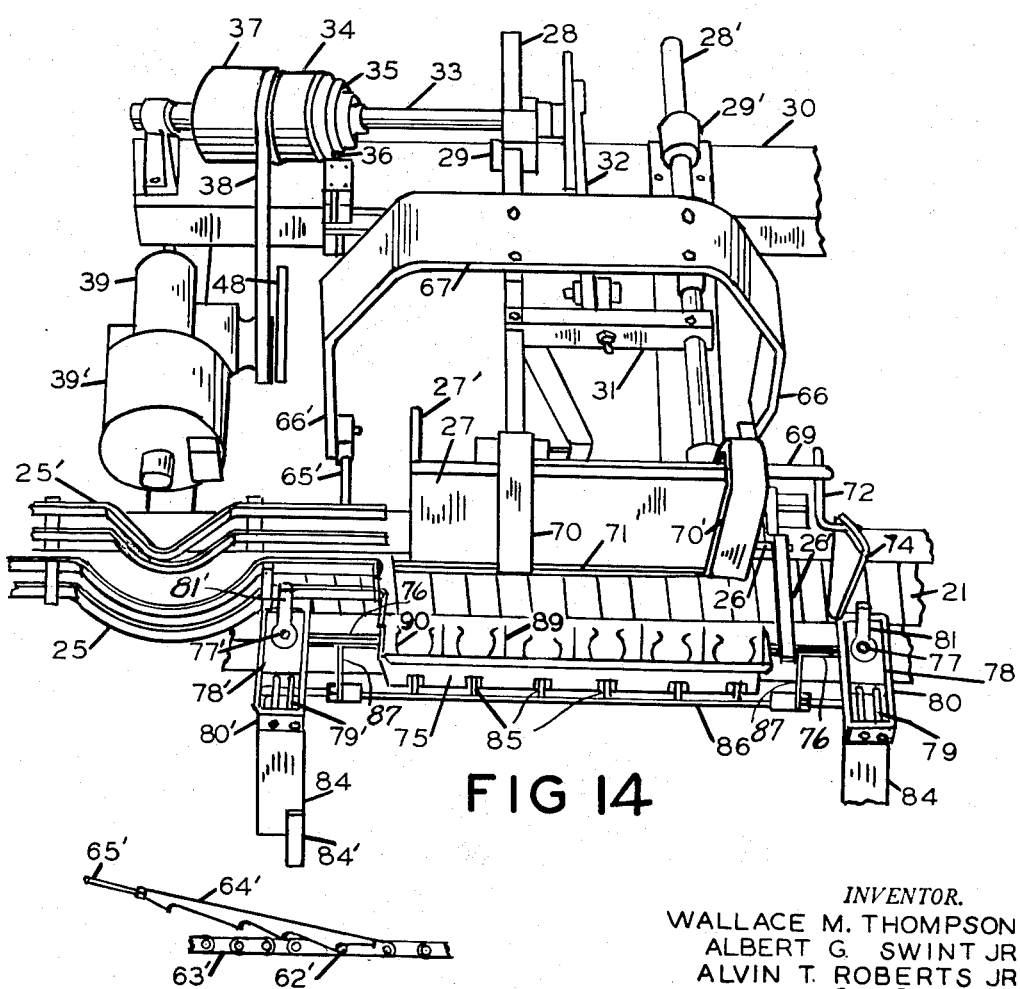
FIG 14
FIG 21
INVENTOR.
WALLACE M. THOMPSON
ALBERT G. SWINT JR
ALVIN T. ROBERTS JR
BY
ATTORNEY

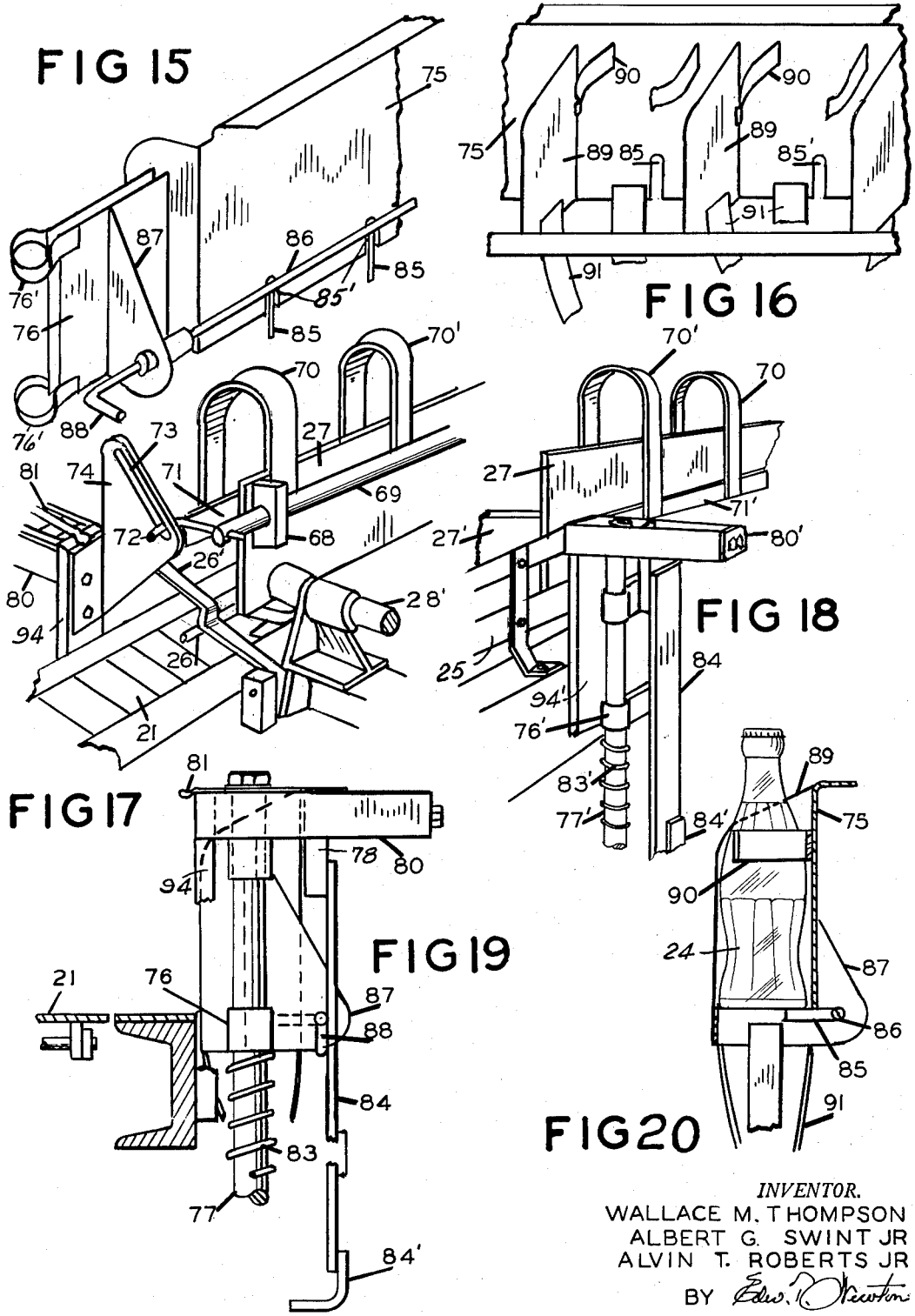

United States Patent Office 2,746,662
Patented May 22, 1956

2,746,662

AUTOMATIC CARTON-CASE LOADING MACHINE

Wallace M. Thompson, Albert G. Swint, Jr., and Alvin T. Roberts, Jr., Cordele, Ga., assignors, by mesne assignments, to Dacam Corporation, Charlotte, N. C., a corporation of North Carolina Application October 27, 1951, Serial No. 253,504

18 Claims. (Cl. 226—14)

This invention relates to an automatic carton-case loading machine, and more particularly to a machine which will automatically load filled beverage bottles and the like into cases, regardless of whether or not such cases contain cartons by means of which a number of the bottles loaded into the case may be removed simultaneously by removing one or more of the cartons from the case.

Automatic machines have previously been constructed for loading beverage bottles into cases or crates, but such prior art machines were found inadequate for loading bottles into cases containing cartons provided with handles for simultaneously removing and transporting a number of bottles from the case, the difficulty being in the flexibility of such cartons and the close fit of the bottles therein. Cardboard cartons for carrying six beverage bottles have met with widespread favor, and the necessity for providing a machine for automatically loading beverage bottles into cases containing such cartons is readily apparent.

An object of our invention is to provide a machine for automatically loading beverage bottles and the like into cases containing cartons with upstanding handles.

Another object of our invention is to provide an automatic machine which is equally well adapted to loading beverage bottles and the like into cases, whether or not such cases are provided with cartons containing upstanding handles.

Another object of our invention is to provide an automatic crate or case loading machine which will automatically feed empty crates or cases beneath a bottle carrier in a synchronized step-by-step manner while filled beverage bottles or the like are fed along an endless conveyor above said crates or cases for intermittently operating a trigger mechanism for actuating a clutch which will operate a pusher plate, causing the same to move a plurality of bottles from said conveyor into said bottle carrier, which then lowers said bottles into the carton or case disposed thereunder.

Another object of our invention is to provide an automatically operated carton-case loading machine which will positively and efficiently load filled beverage bottles and the like into cases containing cartons as the same are fed to and through the machine.

Another object of our invention is to provide an automatic carton-case loading machine which is simple in design, rugged in construction and relatively inexpensive to manufacture.

Other and further objects and advantages of our invention will appear from the following description taken in connection with the accompanying drawings in which like characters of reference designate corresponding parts throughout the several views, and wherein:

Figure 4 is a side elevation looking along the line 4—4 in Figure 3;

Figure 5 is a top plan view of the loading machine with the cover removed looking substantially along the line 5—5 in Figure 3 with some element omitted for purposes of clarity;

Figure 6 is a vertical sectional view taken along the line 6—6 in Figure 5 and showing somewhat schematically the main features of the invention;

Figure 7 is a view similar to Figure 6 with some parts omitted and showing in dotted lines the movement of certain parts;

Figure 9 is an isometric detail view of the clutch release mechanism;

Figure 10 is another isometric detail view of the clutch release mechanism;

Figure 11 is a horizontal sectional view taken along the line 11—11 in Figure 2 and showing the case feeding means;

Figure 12 is a cross-sectional view taken along the line 12—12 in Figure 11;

Figure 13 is a cross-sectional view taken along the line 13—13 in Figure 11;

Figure 14 is a perspective view of the top part of the loading machine looking in the same direction as Figure 3;

Figure 15 is an isometric view with parts broken away of the bottle carrier looking in the direction of arrow 15 in Figure 5;

Figure 16 is a perspective view of the opposite side of the bottle carrier of Figure 15 with parts broken away;

Figure 17 is a perspective view looking in the direction of arrow 17 in Figure 5;

Figure 18 is a perspective view looking at the opposite side from Figure 17;

Figure 19 is a vertical sectional view taken along line 19—19 in Figure 3;

Figure 20 is a vertical sectional view taken along line 20—20 in Figure 3 and showing a bottle positioned in the bottle carrier;

Figure 21 is a view of the case feeding mechanism taken along line 21—21 in Figure 3.

Figure 1:
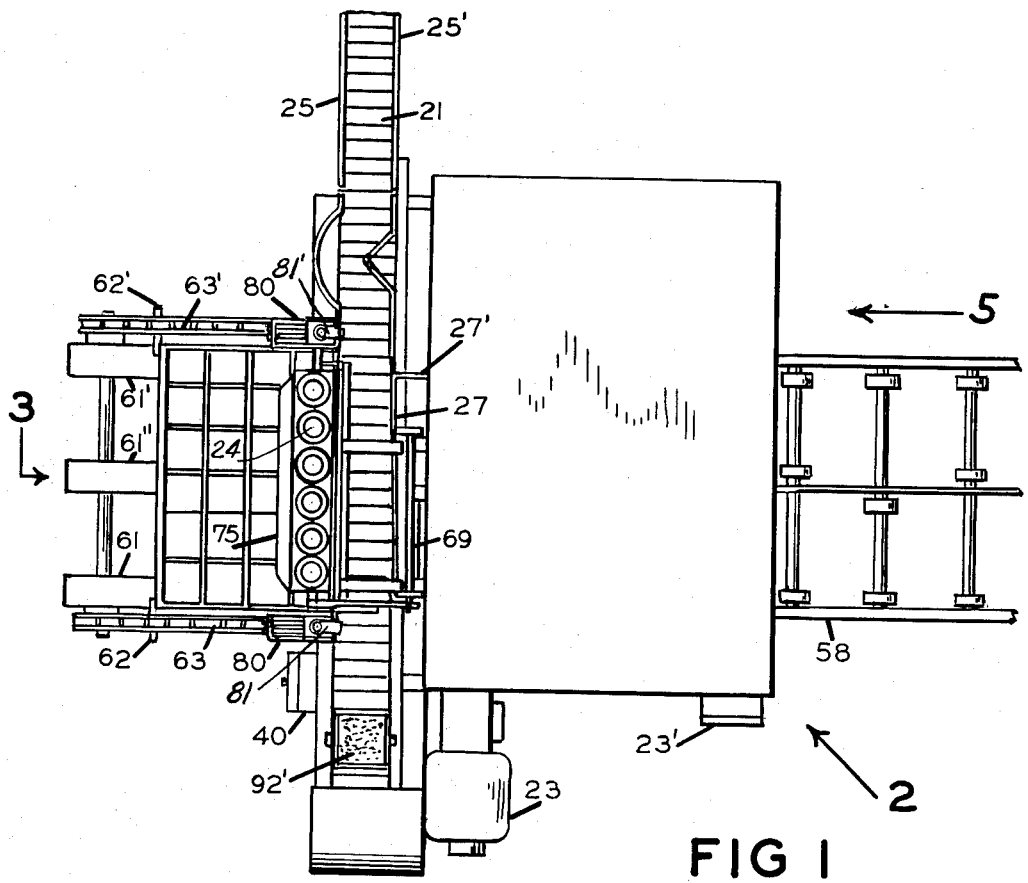
Figure 1 is a top plan view of the loading machine.
Figure 2:
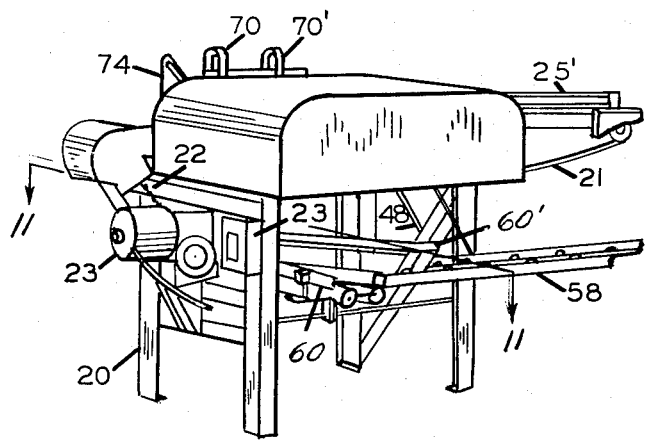
Figure 2 is a perspective view of the loading machine looking in the direction of arrow 2 in Figure 1.
Figure 3:
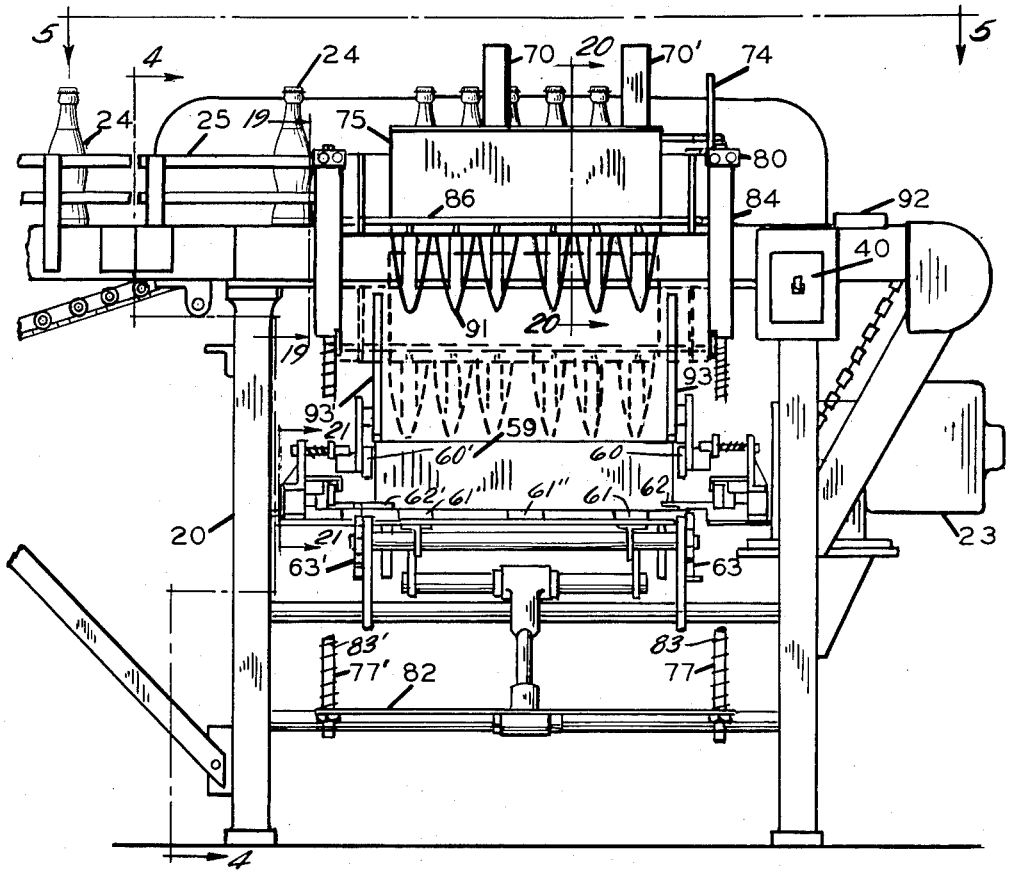
Figure 3 is a front elevation of the loading machine looking in the direction of arrow 3 in Figure 1.
Figure 8:
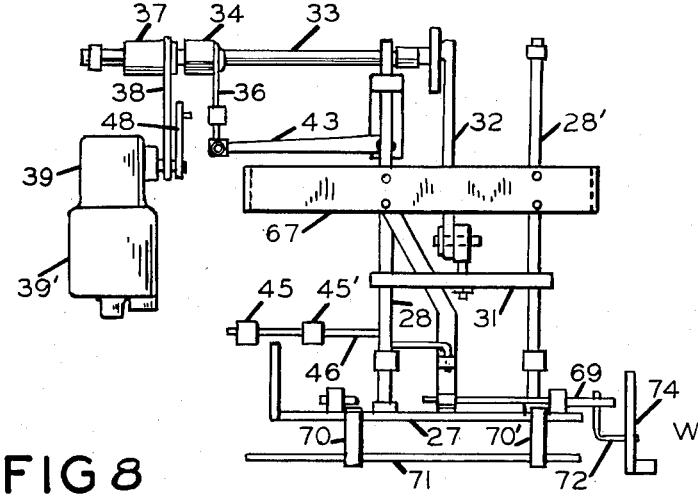
Figure 8 is a somewhat schematic top plan view the same as Figure 5 with parts omitted for purpose of clarity.

In the embodiment of our invention chosen for the purpose of illustration, an upright frame 20 supports an endless conveyor 21, which is arranged to travel horizontally across the front of the frame 20 at the top thereof, the conveyor 21 being driven by chain 22, which is operatively connected to electric motor 23, which is wired to switch box 23' for connection thereby to a source of electric power (not shown). Filled bottles 24 are fed into the machine on the endless conveyor 21, as shown in Fig. 3, and the guide rails 25, 25' are provided to retain the bottles in upright position as they are moved along by the conveyor. A trigger arm 26 is positioned across the conveyor 21 to contact and arrest the movement of bottles across the machine and to set in motion other mechanism to be hereinafter more fully described in detail. A trigger latch 26' pivoted at 19 and having an offset medial portion to lockingly engage the free end of the trigger arm 26 is also positioned across the conveyor 21 and behind the trigger arm 26 remote from the bottles 24 as shown in Figs. 5, 6, 14 and 17 to control movement of the arm 26 by the bottles 24. It is apparent that when the trigger latch 26' is in raised position as shown in Fig. 6 the offset portion thereof is clear of the free end of the trigger arm 26 to permit the trigger arm to be moved by the bottles 24. It will be observed in Figs. 1 and 12 that the guide rails 25, 25' are provided with an offset portion around which the bottles must pass before reaching the delivery end of the guide rails. The purpose of this offset is to relieve some of the pressure of a long line of bottles on the conveyor 21 by causing the thrust to be diverted, thereby causing the bottles to move around the offset and then into the loading mechanism without undue pressure on the trigger arm 26 which is operated by pressure exerted against it by the bottles. Too much pressure on the trigger arm 26 could force this arm out of position and permit an extra bottle to partially enter the loading mechanism and jam the operation of the machine.

Arranged in upright position beside the conveyor 21 at the delivery end of the guide rails 25, 25' is a pusher plate 27, which is provided on the near end with a backwardly extending bottle stop plate 27'. The pusher plate 27 is fixed to the forward ends of slide rods 28, 28'. The rods 28, 28' are slidably mounted in bearings 29, 29', respectively, which are fixed to a cross-frame member 30, as best shown in Figs. 5 and 14. Reciprocating motion is imparted to the rods 28, 28' through a tie rod 31 and crank arm 32, which is eccentrically mounted on the end of shaft 33 to which intermittent rotary motion is imparted through clutch mechanism 34, of known construction, which is controlled by locking cam 35 and clutch finger 36, in a manner to be hereinafter described, the constantly rotating part 37 of the clutch mechanism being connected by belt 38 to speed reducer 39 which is arranged to be driven by electric motor 39'. Electric motor 39' is electrically connected through switch box 40 to a source of electric power (not shown), switch box 40 being mounted on the front of the frame 20 for easy access by an operator.

Clutch finger 36 is mounted for sliding movement in guide block 41, as shown in Figs. 5 and 9, and pivotally connected at 42 to one end of rocker arm 43 which is pivotally mounted at 44 for rocking motion imparted thereto by the pressure of bottles against trigger arm 26 which is affixed to the forward end of rocker arm 43, as shown in Figs. 5 and 10. Counter-balance weights 45, 45' are adjustably supported upon the weight arm 46 which is pivoted at 46' and connected to rocker arm 43 by link 46", as shown in Fig. 9, in a manner to bias the clutch finger 36 against the cam 35.

The electric motor 39' also drives the carton-case feed belts 47, 47' by means of belt 48 running over pulley 49 on feed belt shaft 50 in Fig. 5 which is journaled for rotation on support arms 51, 51' in Fig. 11, these support arms being fastened to rock shaft 52 which is adjustably mounted on upright members of the frame 20. As seen in Fig. 11, the carton-case feed belts 47, 47' run over driving pulleys 53, 53', respectively, which are fixed to the shaft 50 for rotation therewith, and these belts extend forwardly in parallel relationship to pass over driven pulleys 54, 54', respectively, which are journaled for rotation upon stub shafts 55, 55', respectively, carried by brackets 56, 56' on fixed shaft 57.

The carton-case feed belts 47, 47' are arranged perpendicular to the endless conveyor 21 and at a much lower level for a purpose to be fully described hereinafter. An inclined roller-feeder 58 is aligned with the carton-case feed belts 47, 47', said feeder being arranged to feed empty cases 59 (shown in Fig. 4), which may or may not be provided with cartons 59', onto these belts 47, 47' and between the side guides 60, 60' which are also aligned with the feed belts 47, 47' and spaced apart so that the ends of cases riding on the feed belts will bear against these side guides with a sliding fit, the ends of these guides being flared outwardly for the entrance of cases, as shown in Fig. 11, for correctly positioning the cases laterally of the machine. Beneath the side guides 60, 60', respectively, and in alignment therewith, but at a lower level, are carton-case support rails 61, 61', with center support rail 61" placed therebetween, as shown in Fig. 11. It will be noted in Figs. 12 and 13 that these support rails are at a slightly lower level than the upper level of the carton-case feed belts 47, 47' so that these feed belts will bear against the bottoms of cases 59 and move them along to a point on the support rails where they will be engaged by the pawls 62, 62' on the indexing chains 63, 63', respectively. Pawls 62, 62' project from both sides of the chains 63, 63', respectively, and it is in the inner ends of these pawls which engage the cases 59, the outer ends of these pawls being arranged for engagement by notches in the lower faces of elongated pawl chasers 64, 64', respectively as shown in Figs. 6 and 21. These pawl chasers have free forward ends, their opposite ends being adjustably secured to chaser rods 65, 65', respectively, as shown in Figs. 5 to 7 and 14, which are pivotally mounted on the lower ends of the depending arms 66, 66' of the yoke 67. Yoke 67 is secured to slide rods 28, 28' for reciprocating movement thereby, and such movement is imparted to the pawl chasers 64, 64' for indexing the chains 63, 63' carrying the cases into position to be loaded with bottles, as will be fully described hereinafter.

Mounted in bearing blocks 68, 68', as shown in Figs. 5 to 7 and 17, which are fixed to the back of the pusher plate 27, is a tilt shaft 69 to which are affixed the tilt arms 70, 70' comprising generally inverted U-shaped members which extend upwardly over the top of the pusher plate 27, then forwardly across the endless conveyor 21 into substantial alignment with the guide rail 25 and then downwardly to a height above the conveyor 21 approximately half way between the top and bottom of the pusher plate 27. To the free ends of the tilt arms 70, 70' is affixed a tilting guide bar 71 which is positioned substantially in alignment with the guide rail 25 and at a height above the conveyor 21 approximately the same as explained above for the forwardly extended ends of the tilt arms 70, 70', thus forming a substantial holding member for bottles in front of the pusher plate 27. Rocking movement is imparted to the shaft 69 to tilt the bar 71 by means of the tilt rod 72 which has one end fixed to the shaft 69 and the other end is bent to ride in a slot 73 in tilting brackets 74 which is fixed to the frame, as shown in Figs. 6, 7, 14 and 17. Thus when the pusher plate 27 is moved forward by the slide rods to deliver bottles into the bottle carrier, the end of the bar 72 riding in slot 73 in the stationary bracket 74 moves upwardly as well as forwardly so as to impart rocking movement to the shaft 69 which in turn rocks or tilts the device 70 to the raised position shown in broken lines in Fig. 7.

Across the endless conveyor 21 in front of the pusher plate 27 is a bottle carrier 75 having a single side wall and two end walls, and being open at the top and bottom and on the side facing the pusher plate 27 as shown in Figs. 5 and 14. The bottle carrier is supported by end wall extensions 76 (Figs. 5, 6 and 15) which terminate in ring-shaped holders 76' which encircle the vertical suspension rods 77, 77' with a sliding fit thereon. The upper ends of the suspension rods 77, 77' extend through suspension blocks 78, 78', respectively, which are slidably mounted on slide rods 79, 79' in suspension boxes 80, 80' as shown in Fig. 14, the suspension boxes being rigidly secured at their inner ends to upright frame members 94, 94', as shown in Figs. 6 and 17. Held in place on top of each of the suspension blocks 78, 78' are spring fingers 81, 81' which engage an edge of the associated suspension box nearest the endless conveyor 21 as shown in Figs. 17 and 19 to maintain the suspension blocks 78, 78' in normal operating position and prevent the same from sliding on rods 79, 79'. The suspension rods 77, 77' are tied together at their lower ends by tie rod 82 as shown in Fig. 3, and coil springs 83, 83' encircle the suspension rods 77, 77', respectively, between the tie rod 82 and the holders 76' as shown in Figs. 6, 17 and 18. Depending from the suspension blocks 78, 78' are guide bars 84 which are provided on their lower ends adjacent opposed side edges with bottle carrier stops 84' of less width than the guide bars 84, as shown in Figs. 14 and 18; the guide bars provide means for releasing bottles from the carrier and the carrier stops provide means for limiting downward travel of the carrier, all as will be fully described hereinafter, Support for bottles in the carrier 75 is provided by a plurality of bottle support pins 85 which extend through openings 85' provided in the side wall of the bottle carrier 75 to project beneath the bottles, as shown in Fig. 20, one such pin being provided for each bottle in the carrier. The support pins 85 are rigidly connected at one end to a support pin bar 86 which is mounted for oscillatory movement in wings 87 on the end wall extensions 76 of the bottle carrier as shown in Figs. 5, 6 and 15.

The support pin bar 86 is bent at one end to form a bottle release pin 88 arranged at right angles to the bottle support pins 85, as shown in Figs. 6, 15 and 19.

The bottle carrier 75 as shown in Figs. 5, 14 and 16 is provided with a plurality of compartment walls 89 which divide the carrier into individual compartments for the bottles. Each compartment is provided with a spring clip 90 fastened to the side wall of the bottle carrier and extending across the carrier with its open end facing the pusher plate 27 in a manner to snugly receive a bottle and hold it in the carrier. Each compartment in the bottle carrier is also provided with a plurality of depending slide fingers 91 as shown in Figs. 4, 16 and 20 which extend below the carrier and cushion the release of bottles from the carrier by providing a resilient discharge passageway.

A soap box 92, provided with a sponge 92', is conveniently mounted over the endless conveyor 21.

Bottle carrier arrester bars 93, 93' (Figs. 3 and 4) are pivotally supported on each side of the cases 59 and arranged to bear against the top of each case as it is loaded or to swing out and stop the downward travel of the bottle carrier if there is no case in position to receive the bottles.

In the operation of our machine, filled bottles, or other articles to be loaded, are fed single file along the endless conveyor 21 until the leading bottle is stopped in front of the pusher plate 27 by the trigger arm 26. The conveyor 21 is soaped from the soap box 92 so that when the bottles are stopped by the trigger arm 26 they will slide on top of the conveyor without undue friction. Proper single file alignment of bottles in front of the pusher plate is maintained by means of guide bar 71.

Counter-balance weights 45, 45' are adjusted so that when the desired number of bottles have been delivered to the machine and lined up in front of pusher plate 27, the pressure of the bottles against the trigger arm 26 (Figs. 5 and 6) will overcome the action of the counter-balance weights and move the trigger mechanism to release the clutch finger 36 from locking cam 35 to drive the pusher plate 27 forward by means of clutch mechanism 34. As the pusher plate is moved forward across the article feeding conveyor 21, the guide bar 71 is tilted upwardly and out of the way by rod 72 riding in slot 73, as indicated by broken lines in Fig. 7, so as to clear the tops of bottles when the pusher plate moves back after delivering bottles to the bottle carrier 75. Forward movement of the pusher plate 27, of course, will not take place if the bottle carrier 75 is not in position to receive the bottles pushed off of the conveyor 21 by the pusher plate 27, because the pivoted trigger latch 26' which lies behind the trigger arm 26 has its free end positioned to lie over an end wall extension 76 as shown in Figs. 5, 6 and 14 of the bottle carrier so as to be raised to clear the trigger arm 26 and allow movement of the same only when the bottle carrier is in position to receive bottles pushed into it by the pusher plate 27.

Spring clips 90 hold the bottles firmly in place in the bottle carrier, and are designed to receive the bottles without undue pressure; however, if a jam should occur so as to cause undue pressure when the pusher plate 27 is attempting to load bottles into the bottle carrier, spring fingers 81, 81' will release the suspension blocks 78, 78' to permit them to move away along the slide rods 79, 79' to relieve the pressure.

At the same time the pusher plate 27 is delivering bottles to the bottle carrier 75, yoke 67 is carried forward by slide rods 28, 28' to cause the pawl chasers 64, 64' operatively connected thereto, acting on pawls 62, 62', to move an empty case 59 into position directly below the bottle carrier so as to receive the first row of bottles.

The weight of the bottles in the bottle carrier 75 will cause the bottle carrier to slide downwardly along suspension rods 77, 77' against the action of springs 83, 83'. While the bottle carrier is moving downwardly, the bottles are supported in the carrier upon support pins 85 which are held beneath the bottles by the action of the bottle release pin 88 which is then held in a substantially vertical position by sliding action against the inner surface of the guide bar 84, as shown in Figs. 6 and 19. When the bottle release pin 88 passes the lower end of guide bar 84, there is no longer any support to hold this pin in vertical position, because the bottle carrier stop 84' is narrower than guide bar 84 and is attached adjacent one edge of guide bar 84, as seen most clearly in Fig. 14, so as not to engage pin 88, and the weight of the bottles on support pins 85 rotates support pin bar 86 and removes the supports from beneath the bottles in the bottle carrier. Almost immediately, the support pin bar 86 strikes the bottle carrier stops 84' and arrests the downward movement of the bottle carrier 75. With the supports removed from beneath the bottles as above described, the bottles in the bottle carrier are free to move downwardly and outwardly from the bottle carrier through the depending slide fingers 91 which extend below the carrier and cushion the release of bottles from the carrier by providing a resilient discharge passageway into the proper compartment in the empty case 59 which has been positioned, as above described, to receive a row of bottles.

It will be remembered that the case 59 was moved into position simultaneously with the loading of the bottles into the bottle carrier, so that the case comes to rest in the proper position before the bottle carrier begins its descent to load the bottles into the case.

When the bottles have been released from the bottle carrier, the weight of the carrier alone is overcome by the action of springs 83, 83' which will then return the carrier to its upwardmost position in horizontal alignment with the conveyor 21. While the bottle carrier is performing its function of transporting a load of bottles downwardly, the conveyor 21 runs continuously and positions bottles in single file in front of the pusher plate 27 and against the trigger arm 26, but the trigger arm 26 is held in locked position by the trigger latch 26' by reason of the fact that the downward movement of the bottle carrier 75 has removed the support from beneath the free end of the trigger latch 26', and the trigger latch will not release the trigger arm until the bottle carrier returns to its bottle receiving position. When the bottle carrier 75 is again horizontally aligned with the conveyor 21 in bottle receiving position, the trigger latch 26' releases the trigger arm 26 to again set the pusher plate 27 in operation to move another load of bottles into the bottle carrier.

During the movement of the pusher plate 27, the stop bar 27' blocks the passage of bottles along the route of the conveyor 21, but, as soon as the pusher plate is returned to its retracted position, additional bottles are positioned single file in front of the pusher plate even before the bottle carrier delivers its load downwardly and returns to its bottle receiving position, thus avoiding delay and stepping up the operation of successive loadings.

It will be apparent that each time the pusher plate 27 is moved forward, an empty case 59 is indexed into proper position beneath the bottle carrier by a distance sufficient to provide for reception of another row of bottles. The varying distance between adjacent rows of bottles in a single case, and the distance between rows of bottles in adjacent cases is taken care of by the positioning of the notches in the lower faces of the elongated pawl chasers 64, 64', and in the positioning of the pawls 62, 62' on the indexing chains 63, 63', respectively. Also, it will be apparent that our machine is equally adaptable to loading cases, either with or without cartons therein, because the cases, carton-cases or other containers are fed into our machine a distance far enough below the article feeding means to permit the cases, carton-cases, or other containers of varying heights, to pass beneath the article feeding means, and yet our machine operates deftly to lower the bottles or other articles into the containers without breaking or undue jarring.

Having thus described our invention, it will be obvious to those skilled in the art that we have provided an automatic machine of great usefulness, and that while we have illustrated and described our invention in a very practical embodiment thereof without attempting to illustrate or describe other embodiments or adaptations which we contemplate, various changes and modifications may be made without departing from the scope of our invention as defined in the following claims.

We claim:

1. An automatic case loading machine having article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism for periodically setting said drive means in motion to move said pusher plate forwardly across said article feeding means to remove said articles from said article feeding means, characterized by an article carrier mounted for up and down reciprocating movement, said article carrier having an open side adjacent said article feeding means to receive articles removed from said article feeding means by said pusher plate, resilient means urging said article carrier upwardly with a force which is overcome by a load of articles in said article carrier to cause said carrier to move downwardly, stop means for limiting the downward movement of said article carrier, and support means on said carrier for releasably holding articles in said carrier.

2. An automatic case loading machine having article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism for periodically setting said drive means in motion to move said pusher plate forwardly across said article feeding means to remove said articles from said article feeding means, characterized by an article carrier mounted for up and down reciproacting movement, said article carrier having an open side adjacent said article feeding means to receive articles removed from said article feeding means by said pusher plate, resilient means urging said article carrier upwardly with a force which is overcome by a load of articles in said article carrier to cause said carrier to move downwardly, and support means on said carrier for releasably holding articles in said carrier until said carrier approaches its lowest point of movement.

3. An automatic case loading machine having article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism for periodically setting said drive means in motion to move said pusher plate forwardly across said article feeding means to remove said articles from said article feeding means, characterized by an article carrier mounted for up and down reciprocating movement adjacent said article feeding means, said article carrier having an open side adjacent said article feeding means to receive articles removed from said article feeding means by said pusher plate, resilient means urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

4. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, and tilting means arranged to tilt said guide bar upwardly when said pusher plate is moved forwardly across said article feeding means.

5. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a stationary tilting bracket mounted adjacent one end of said pusher plate, said bracket being provided with an inclined slot, and a tilting lever fastened to said guide bar and having an end arranged to slide in said slot to tilt said guide bar upwardly when said pusher plate is moved forwardly across said article feeding means.

6. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a pair of suspension rods mounted adjacent said article feeding means, an article carrier slidably mounted on said suspension rods for up and down reciprocating movement, said article carrier having an open side adjacent said article feeding means to receive articles removed from said article feeding means by said pusher plate, resilient means urging said article carrier upwardly with a force which is overcome by a load of articles in said article carrier to cause said carrier to move downwardly, support means on said carrier for releasably holding articles in said carrier until said carrier approaches its lowest point of movement, and feeder means operated by said motive power means for moving empty cases into position to receive articles released from said article carrier.

7. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a pair of suspension rods mounted adjacent said article feeding means, an article carrier slidably mounted on said suspension rods for up and down reciprocating movement, said article carrier having an open side adjacent said article feeding means to receive articles removed from said article feeding means by said pusher plate, resilient means urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

8. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a pair of suspension rods mounted adjacent said article feeding means, said rods being hung from their upper ends, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

9. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

10. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a tilting lever fastened to said guide bar and arranged to tilt said guide bar upwardly when said pusher plate is moved forwardly across said article feeding means, a pair of suspension rods mounted adjacent said article feeding means, said rods being hung from their upper ends, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a load of articles in said article carrier to cause said carrier to move downwardly, stop means for limiting the downward movement of said article carrier, support means on said carrier for releasably holding articles in said carrier until said carrier appoaches its lowest point of movement, and feeder means operated by said motive power means for moving empty cases into position to receive articles released from said article carrier.

11. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a tilting lever fastened to said guide bar and arranged to tilt said guide bar upwardly when said pusher plate is moved forwardly across said article feeding means, a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

12. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a stationary tilting bracket mounted adjacent one end of said pusher plate, said bracket being provided with an inclined slot, a tilting lever fastened to said guide bar and having an end arranged to slide in said slot to tilt said guide bar upwardly when said pusher plate is moved forwardly across said article feeding means, a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a load of articles in said article carrier to cause said carrier to move downwardly, stop means for limiting the downward movement of said article carrier, support means on said carrier for releasably holding articles in said carrier until said carrier approaches its lowest point of movement, and feeder means operated by said motive power means for moving empty cases into position to receive articles released from said article carrier.

13. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a stationary tilting bracket mounted adjacent one end of said pusher plate, said bracket being provided with an inclined slot, a tilting lever fastened to said guide bar and having an end arranged to slide in said slot to tilt said guide bar upwardly when said pusher plate is moved forwardly across said article feeding means, a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, springs on said suspension rods urging said article carrier upwardly with a force which is overcome by a full load of articles in said article carrier to cause said carrier to move downwardly, stop means for limiting the downward movement of said article carrier, support means on said carrier for releasably holding articles in said carrier until said carrier approaches its lowest point of movement, depending yoke means operatively connected to said motive power means, and feeder means operated by said yoke means for moving empty cases into position to receive articles released from said article carrier.

14. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a stationary tilting bracket mounted adjacent one end of said pusher plate, said bracket being provided with an inclined slot, a tilting lever fastened to said guide bar and having an end arranged to slide in said slot to tilt said guide bar upwardly when said pusher plate is moved forwardly across said article feeding means, a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, resilient holder means fastened inside said article carrier for holding articles in place therein, springs on said suspension rods urging said article carrier upwardly with a force which is overcome by a full load of articles in said article carrier to cause said carrier to move downwardly, stop means for limiting the downward movement of said article carrier, support means on said carrier for releasably holding articles in said carrier until said carrier approaches its lowest point of movement, depending yoke means operatively connected to said motive power means, and feeder means operated by said yoke means for moving empty cases into position to receive articles released from said article carrier.

15. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and trigger mechanism operated by said articles for periodically setting said drive means in motion to move said pusher plate forwardly across said article feeding means to remove said articles from said article feeding means, characterized by a guide bar swingably mounted on said pusher plate positioned in front of said pusher plate to hold articles against said pusher plate, a stationary tilting bracket mounted adjacent one end of said pusher plate, said bracket being provided with an inclined slot, a tilting lever fastened to said guide bar and having an end arranged to slide in said slot to tilt said guide bar upwardly when said pusher plate is moved forwardly across said article feeding means, a pair of suspension rods releasably mounted adjacent said article feeding means, said rods being hung from their upper ends, means releasably holding said ends adjacent said article feeding means, an article carrier slidably mounted on said suspension rods for up and down reciprocating movement, said article carrier having an open side adjacent said article feeding means to receive articles removed from said article feeding means by said pusher plate, resilient holder means fastened inside said article carrier for holding articles in place therein, springs on said suspension rods urging said article carrier upwardly with a force which is overcome by a full load of articles in said article carrier to cause said carrier to move downwardly, stop means for limiting the downward movement of said article carrier, support means on said carrier for releasably holding articles in said carrier until said carrier approaches its lowest point of movement, depending yoke means operatively connected to said motive power means, cam feeder means operated by said yoke means for moving empty cases into position to receive articles released from said article carrier, and resilient means depending from said carrier for guiding articles released from said carrier into said empty cases.

16. An automatic case loading machine having article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and means for periodically setting said drive means in motion to move said pusher plate forwardly across said article feeding means to remove said articles from said article feeding means, the combination therewith of an article carrier mounted for up and down reciprocating movement, said article carrier having an open side adjacent said article feeding means to receive articles removed from said article feeding means by said pusher plate, means urging said article carrier upwardly with a force which is overcome by a load of articles in said article carrier to cause said carrier to move downwardly, stop means for limiting the downward movement of said article carrier, and support means on said carrier for releasably holding articles in said carrier.

17. An automatic case loading machine having article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and means for periodically setting said drive means in motion to move said pusher plate forwardly across said article feeding means to remove said articles from said article feeding means, the combination therewith of an article carrier mounted for up and down reciprocating movement, said article carrier having an open side adjacent said article feeding means to receive articles removed from said article feeding means by said pusher plate, means urging said article carrier upwardly with a force which is overcome by a load of articles in said article carrier to cause said carrier to move downwardly, and support means on said carrier for releasably holding articles in said carrier until said carrier approaches its lowest point of movement.

18. An automatic case loading machine having movable article feeding means for the single file feeding thereinto of articles to be loaded, conveyor means for feeding empty cases beneath said article feeding means and transversely to the movement thereof, a pusher plate slidably mounted for reciprocating motion to remove said articles from said article feeding means, motive power drive means operatively connected to said pusher plate, and means operated by said articles for periodically setting said drive means in motion to move said pusher plate forwardly across said article feeding means to remove said articles from said article feeding means, in combination therewith a guide bar swingably mounted on said pusher plate positioned in front of said pusher plate to hold articles against said pusher plate, and tilting means arranged to tilt said guide bar upwardly when said pusher plate is moved forwardly across said article feeding means.

References Cited in the file of this patent

UNITED STATES PATENTS

| Re. 21,288 | Novotny | Dec. 5, 1939 |
| 1,354,250 | Hawthorne | Sept. 28, 1920 |
| 2,067,301 | Miller, Sr. | Jan. 12, 1937 |
| 2,252,127 | Kimball | Aug. 12, 1941 |
| 2,644,626 | Britt | July 7, 1953 |
| 2,684,800 | Lewis | July 27, 1954 |